(12) United States Patent
Kliman et al.

(10) Patent No.: US 6,208,132 B1
(45) Date of Patent: Mar. 27, 2001

(54) NON-INTRUSIVE SPEED SENSING FOR INDUCTION MOTORS

(75) Inventors: Gerald Burt Kliman, Niskayuna; John Andrew Mallick, Scotia, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/184,687

(22) Filed: Nov. 2, 1998

(51) Int. Cl.$^7$ ................................. G01P 3/48; G01P 3/54
(52) U.S. Cl. ..................... 324/177; 324/163; 324/173; 378/94
(58) Field of Search ................... 324/160, 163, 324/164, 166, 167, 173, 177, 226, 772; 378/91, 94; 336/20, 84 R, 222, 225

(56) References Cited

U.S. PATENT DOCUMENTS

| 534,596 | 2/1895 | Atwood et al. . |
|---|---|---|
| 3,943,356 | 3/1976 | Schmutzer et al. . |
| 4,761,703 | 8/1988 | Kliman et al. . |
| 4,839,585 | 6/1989 | Bicknell . |
| 5,049,815 | 9/1991 | Kliman . |
| 5,530,343 | 6/1996 | Bowers, III et al. . |
| 5,828,210 | 10/1998 | Kliman et al. . |

OTHER PUBLICATIONS

J. Penman et al., "Condition monitoring or electrical drives," IEE Proceedings, vol. 133, Part B, No. 3, May 1986.
M. S. Erlicki et al., "Leakage Field Changes of an Induction Motor and Indication of Nonsymmetric Supply," IEEE Transactions on Industry and General Applications, vol. IGA–7, No. 6, Nov./Dec. 1971.

Primary Examiner—Jay Patidar

(57) ABSTRACT

A sensing coil affixed to the outside of an induction motor housing uses flux signals from the motor to measure motor speed. In particular, components of the rotor current are measured and compared to analysis from stator fundamentals and sidebands to determine the true rotor frequency which can then be used to determine the motor speed. A shield and/or a compensating coil can optionally be used to filter out extraneous signal noise.

17 Claims, 3 Drawing Sheets

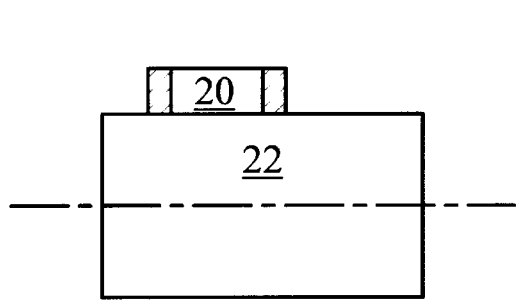
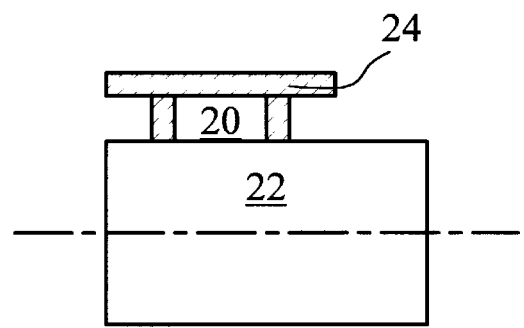
FIG. 2          FIG. 3
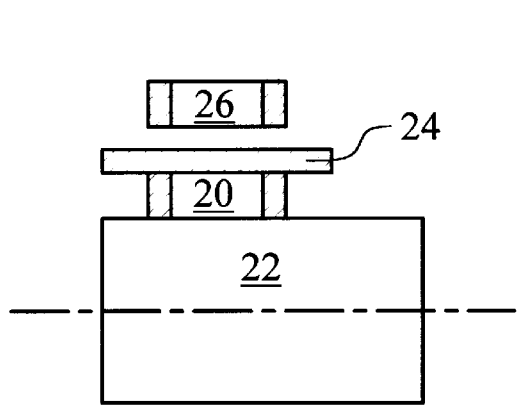
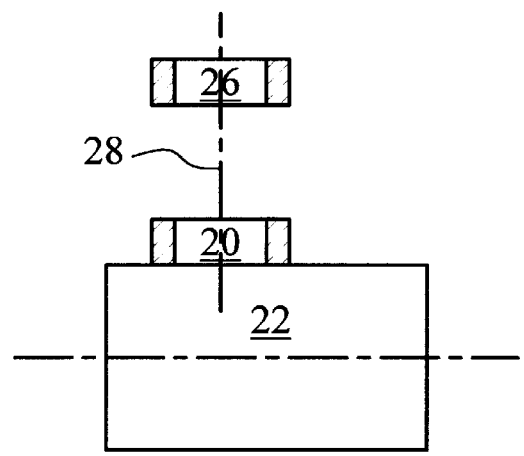
FIG. 4          FIG. 5

NON-INTRUSIVE SPEED SENSING FOR INDUCTION MOTORS

BACKGROUND

This invention relates generally to measuring a motor speed for an induction motor, and specifically for measuring motor speed using a sensing coil to determine a rotor frequency.

The rotor frequency is used with a stator frequency to calculate the motor speed. In a two pole motor, for example, such as used for X-ray tubes, the speed (in rotations per minute) is equal to sixty times the difference between the stator and rotor frequencies (in hertz). The stator frequency is easily obtainable from the external leakage flux or the stator current spectrum. The determination of rotor frequency has been more difficult.

Flux sensing coils used to measure rotor frequency must often be placed far from the motor, sometimes with metal casings intervening. Additionally, if the motor is mounted on a rotating platform, the Earth's field may give rise to confusion in the signals.

Flux sensing coils have been used to measure motor speed via rotor leakage flux, as described, for example, in commonly-assigned U.S. Pat. Nos. 5,049,815 and 4,761,703; in other U.S. Pat. Nos. 534,596, 3,943,356, 4,839,585, and 5,530,343; in J. Penman et al., "Condition monitoring of electrical drives," IEEE Proceedings, Vol. 133, Part B, No. 3, May 1986; and M. S. Erlicki et al., "Leakage Field Changes of an Induction Motor and Indication of Nonsymmetric Supply," IEEE Transactions on Industry and General Applications, vol. IGA-7, no. 6, November/December 1971. But these approaches typically require intrusive mounting of the sensing coil inside the motor housing, or are prone to errors and external signal interference due to their methods of measuring speed.

SUMMARY OF THE INVENTION

It is therefore desirable to non-intrusively mount a flux sensing coil on the outside of a motor housing, and to obtain a reliable speed determination therefrom despite weak signals and interference.

Briefly, according to one embodiment of the invention, a method for measuring an operational rotor frequency of an induction motor including a rotor and a stator comprises: analyzing a motor flux spectrum in a first vicinity of a specified frequency of the rotor to identify at least one rotor frequency candidate for the operational rotor frequency by identifying rotor current frequencies and harmonics in the first vicinity of the specified rotor frequency; additionally analyzing the motor flux spectrum in a second vicinity of a specified frequency of the stator to derive at least one rotor frequency candidate for the operational rotor frequency by identifying and deriving fundamentals and sidebands of the stator in the second vicinity of the specified stator frequency; and comparing the at least one identified rotor frequency candidate with the at least one derived rotor frequency candidate to determine the operational rotor frequency.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

FIGS. 2–5 schematically illustrate the method and configuration with which a sensing coil is mounted to an encased motor, as well as several methods of shielding out interfering signals using a shield and/or a compensating coil.

DETAILED DESCRIPTION OF THE INVENTION

It has been demonstrated previously that the speed of an induction motor (whether sheet or squirrel cage) may be measured quite accurately by observation of a strong rotor current frequency (sometimes loosely called "slip frequency") line in the spectrum of the external leakage flux (the voltage output signal of the sensing coil), for example, in U.S. Pat. No. 4,761,703. This is done by combining information derived from a flux pickup (sensing) coil linking the stray flux from the rotor end ring or region.

Due to practicalities of coil installation it often happens that the coil must be mounted a considerable distance from the rotor and not in the best orientation. In addition it may happen that the frame/housing of the motor or a metal enclosure may intervene between the rotor and the pickup coil. This is particularly true if it is desired to mount the pickup coil external to the motor housing so as to not interfere with the integrity of the motor and its housing and to allow easy retrofitting to preexisting motors and housings. The result is usually a reduction in signal strength. Moreover the rotor frequency signal and its harmonics may not be attenuated in the same way. In fact it has been observed that the harmonics of the signal are sometimes prominent whereas the signal itself is close to the noise level. Hence it is difficult to determine the true rotor frequency.

Figure 1:
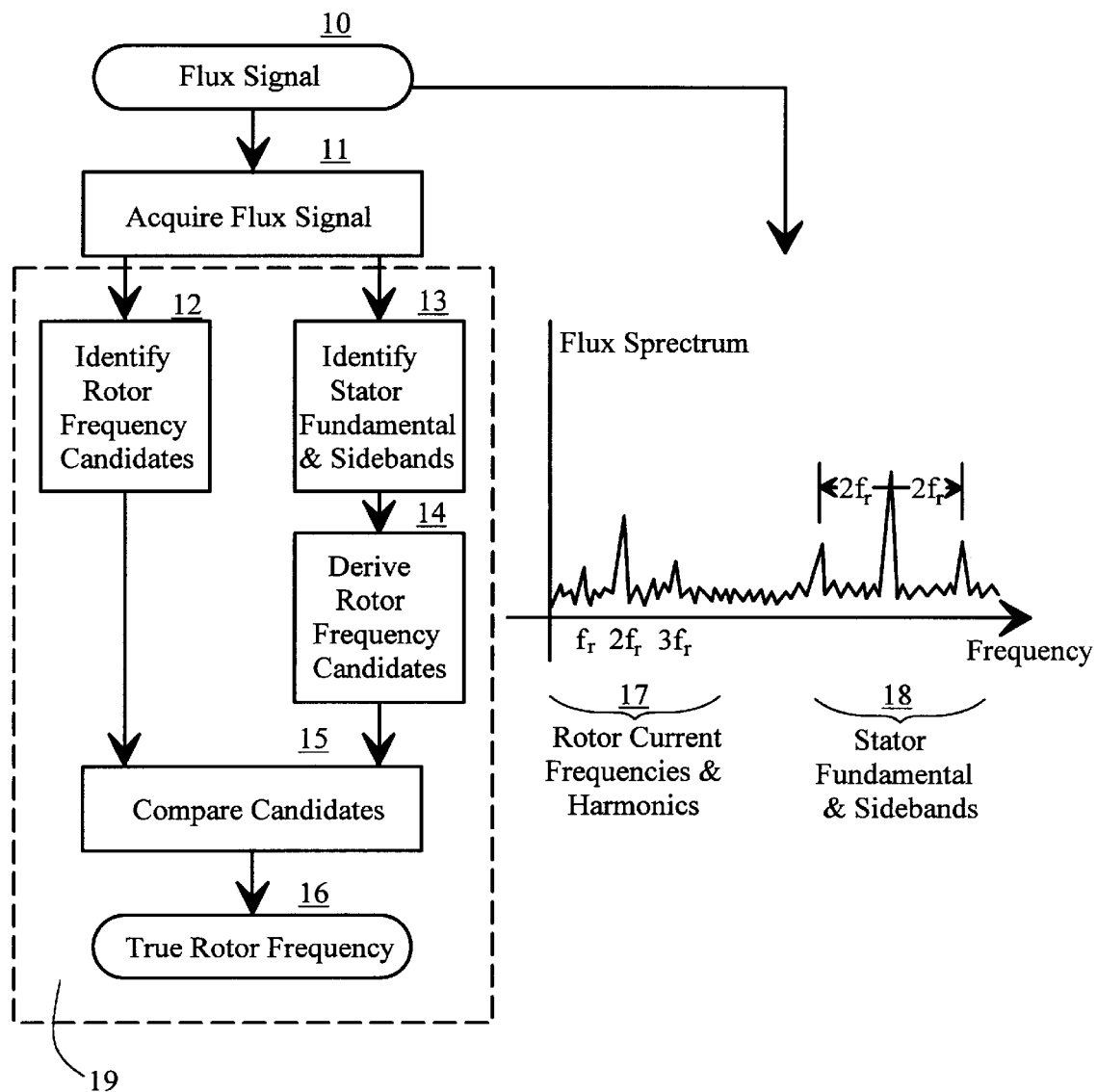
FIG. 1 is a flowchart showing the method for determining rotor frequency in accordance with an embodiment of the invention, with an associated graph of a time derivative of total flux linking a flux pickup coil.

The ambiguity may be resolved by the process depicted in FIG. 1 where a flux spectrum frequency range of observation is extended to the vicinity of the stator frequency. There the sidebands of the fundamental stator frequency—the so-called broken bar frequencies—are separated from the fundamental stator frequency $f_s$, by twice the rotor frequency $f_r$, i.e., by $2f_r$. The frequency of the sidebands (shown by section 18) are analyzed to obtain derived rotor frequency candidates and compared with flux spectrum rotor current frequency candidates (rotor frequency components are shown by section 17). From the comparison, the true operational rotor frequency can be determined.

For the discussion to follow, "specified" describes frequencies that the motor is substantially expected to have based on the motor specifications, and "operational" describes the actual motor frequencies that are measured according to the invention, for the motor in operation. In particular, a motor flux signal 10 is acquired 11 from the motor using a pickup coil 20 (introduced in FIG. 2). The motor flux signal can then be transformed into a motor flux spectrum. One technique for this transformation, for example, is a Fourier transform. The motor flux spectrum is analyzed in the vicinity of the specified frequency of the rotor (designated by section 17), and also in the vicinity of the specified frequency of the stator (designated by section 18). In electronically-controlled motors the switching harmonics will be at much higher frequencies and thus will not interfere, to first order, with the frequency measurements.

At least one identified rotor frequency candidate for the operational rotor frequency $f_r$ in section 17 is identified 12. If the peaks are clear, a single rotor frequency candidate can be identified. If extraneous peaks cause determination of a single frequency candidate to be difficult, multiple candidates are identified.

Derived rotor frequency candidates are derived from analysis of the vicinity of the specified frequency of the stator. One method for deriving rotor frequency candidates can be by determining stator fundamentals and sidebands in section 18 and estimating the rotor frequency as one half the frequency difference between the fundamental and a sideband. Stator frequency side bands, which can be obtained by conventional techniques, should be equidistant from the fundamental stator frequency. If the peaks around the fundamental stator frequency are such that the stator side bands are clearly identified, then a single rotor frequency candidate can be derived. In many spectra, there may be extraneous peaks that make determination of the actual stator sidebands difficult. In such situations, multiple candidates are derived.

Other techniques such as demodulation may be used to derive a rotor frequency candidate. For example, the stator fundamental and sideband frequencies can be demodulated using conventional techniques to produce a signal approximately equivalent to twice the rotor frequency. The frequency of this demodulated signal can then be divided in half and compared with the un-modulated rotor frequency candidate from the motor flux spectrum.

The identified rotor frequency candidate or candidates 12 are then compared 15 with the stator-derived rotor frequency candidate or candidates 14 to obtain a true valuation of the operational rotor frequency 16. At least one identified candidate should be substantially similar to at least one derived candidate. That is, the two candidates should be within the resolution of the Fourier transform. In one embodiment, the two candidates are within one quarter of a Hertz. Larger differences between the two closest candidates create a smaller confidence that the operational rotor frequency has been correctly determined.

Steps 12 through 16 can be implemented using, for example, an analog, digital and/or hybrid computer 19, including various electronic signal detectors as needed.

As illustrated in FIG. 2, the motor speed is measured according to the method of FIG. 1, by affixing a pickup (sensing) coil 20 to a housing 22 enclosing a motor (not shown in FIG. 2). Pickup coil 20 is generally doughnut-shaped and is shown in cross-section from a side view. Affixing coil 20 to housing 22 (cylindrical) can be done simply and inexpensively, for example, by simply using duct tape.

When the motor is part of a larger apparatus that is in motion—usually rotary—such as machine tool spindle drives, CAT scanners, or in various robotics applications, the motion of the coil through the Earth's field may give rise to signals comparable in frequency to the rotor current frequency and may be larger in magnitude. Several remedies are possible.

If the apparatus is in relatively constant rotary motion, which is usually the case for embodiments such as a boring mill table or a CAT scan gantry, for example, and the speed is known, then a signal representative of the interfering frequency can be obtained and removed from the analysis at the motor flux signal or motor flux spectrum level. This step can be added to the process of FIG. 1.

If the apparatus is not in relatively constant rotary motion, if the speed is not known, or if an additional compensation is desired, interference may additionally or alternatively be compensated for at the source. FIGS. 3–5 show several methods and configurations for performing these types of compensation.

In FIG. 3, a thin shield 24, fabricated for example, from a sheet of soft steel, is placed over pickup coil 20 to divert the Earth's field while enhancing the leakage flux field sensed by the flux pickup coil. Very-high-permeability steel commonly used for shielding is preferred, but mild steel will work well enough at considerably lower cost.

If this method and configuration in a given situation is not fully effective to divert the Earth's field from coil 20, a second method and configuration may be used as shown in FIG. 4. Here, a second, or compensating coil 26 similar to pickup coil 20 is placed on the opposite side of shield 24 from pickup coil 20. Compensating coil 26 will link little or no motor flux from the rotor but will be fully exposed to the Earth's field and the external interfering flux. The interfering flux signal from compensating coil 26 is then added in opposition to (subtracted from) the motor flux signal, possibly with variable gain, to null out the ambient field interference. This may be done in an analog manner, or the interfering flux signal may be processed into its spectrum and the nullification handled numerically (digitally).

A third method and configuration is shown in FIG. 5. Here, shield 24 is omitted entirely, and compensating coil 26 is placed in line with pickup coil 20 but with additional distance 28 separating the two coils such that compensating coil 26 again links little of the rotor (or stator) frequency signal but does link the ambient or Earth's field and the interfering flux. Nullification is handled in a manner similar to FIG. 4.

While the above-described methods and configurations are applicable to any situation where it is desired to measure the speed of an induction motor, a particularly important application of the invention is to X-ray tubes, and specifically, to CAT scan X-ray tubes. In this application, it is desired to measure the speed of the motor during a scan to assess bearing condition and other factors. However the tube is mounted on a gantry that is turning at ½ to 2 rps, which introduces signals close in frequency to the rotor current.

Figure 6:
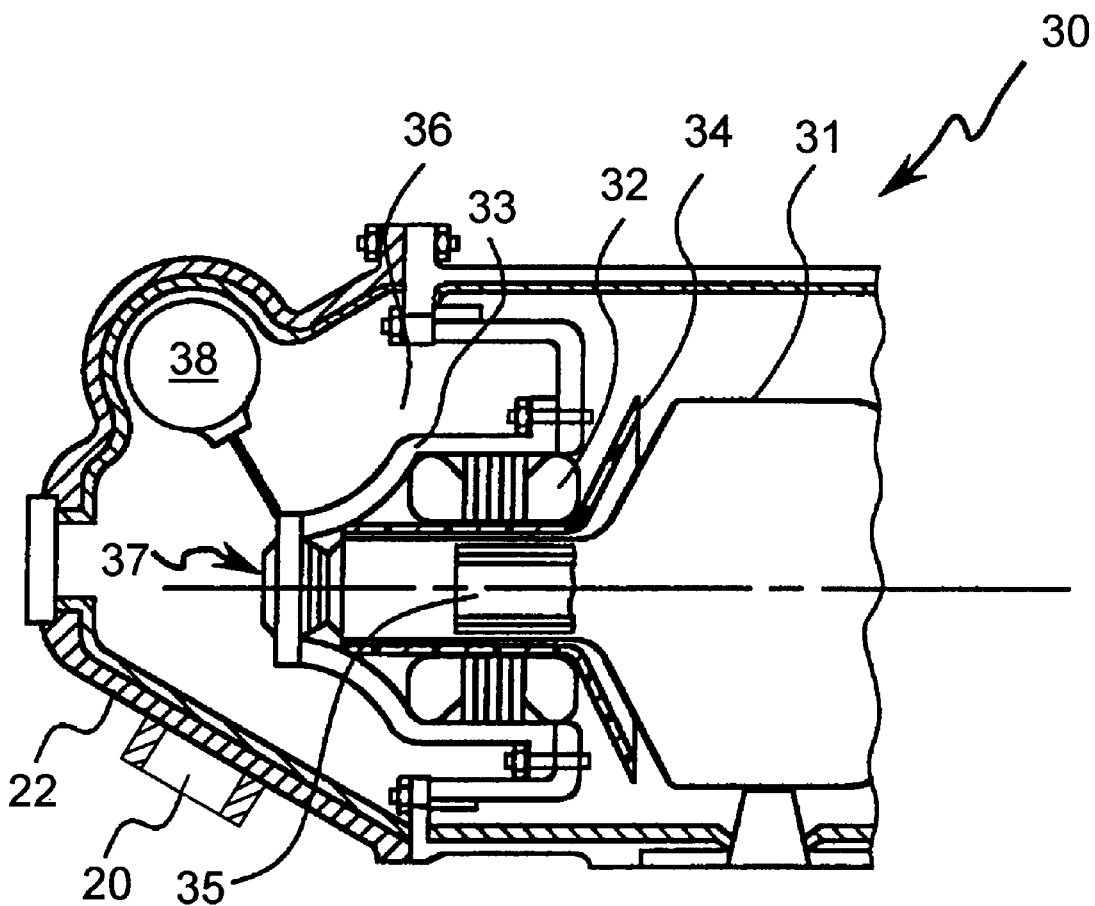
FIG. 6 is a cross-sectional side view of a flux sen sing coil affixed to the exterior of an X-ray tube with glass vacuum envelope and anode rotation motor so as to measure motor speed according to an embodiment of the invention.

FIG. 6 illustrates a conventional, generic X-ray tube 30 comprising housing 22, glass vacuum envelope 31, a motor including a stator 32 and a rotor 35, stator support basket 33, high-voltage shield 34, dielectric oil region 36 containing a dielectric oil which is pumped through stator support basket and used to cool the motor, and high-voltage anode connection 37.

Using the embodiment of the invention shown in FIG. 3 (but recognizing that the other embodiments previously described can also be used), pickup coil 20 is mounted on the exterior housing 22 of the x-ray tube 30. Housing 22 typically comprises an aluminum shell lined with lead. Due to the structures typically used for mounting anode 37 and an oil pump 38 at the end of tube 30, a coaxial position for pickup coil 20 is not convenient, so pickup coil 20 is mounted as shown in order to best link the flux coming from rotor 35.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

What is claimed is:

1. A method for measuring an operational rotor frequency of an induction motor comprising a rotor and a stator, comprising:

analyzing a motor flux spectrum in a first vicinity of a specified frequency of the rotor to identify at least one identified rotor frequency candidate for the operational rotor frequency by identifying rotor current frequencies and harmonics in the first vicinity of the specified rotor frequency;

additionally analyzing the motor flux spectrum in a second vicinity of a specified frequency of the stator to derive at least one derived rotor frequency candidate for the operational rotor frequency by identifying and deriving fundamentals and sidebands of the stator in the second vicinity of the specified stator frequency; and comparing the at least one identified rotor frequency candidate with the at least one derived rotor frequency candidate to determine the operational rotor frequency.

2. The method of claim 1, wherein analyzing the motor flux spectrum in the second vicinity of the specified frequency of the stator to derive the at least one derived rotor frequency candidate includes demodulating the motor flux spectrum in the second vicinity.

3. The method of claim 1, further including attaching a flux pickup coil to an outside of a housing enclosing the motor, acquiring a motor flux signal from the flux pickup coil, and transforming the motor flux signal to the motor flux spectrum.

4. The method of claim 3, further comprising, if an externally interfering flux is present, prior to transforming the motor flux signal to the motor flux spectrum, modifying the motor flux signal by subtracting the interfering flux from the motor flux signal.

5. The method of claim 3, further comprising, if an externally interfering flux is present, prior to analyzing the motor flux spectrum, determining an interfering flux spectrum of the interfering flux and modifying the motor flux spectrum by subtracting the interfering flux spectrum from the motor flux spectrum.

6. The method of claim 3, further comprising shielding the pickup coil from an externally interfering flux by placing a thin shield over the pickup coil such that the pickup coil resides substantially in between the housing and the shield.

7. The method of claim 6, further comprising compensating for the effects of the interfering flux by:

placing a compensating coil substantially on an opposite side of the shield from the pickup coil to obtain an interfering flux signal; and prior to analyzing the motor flux spectrum, using the interfering flux signal to remove the effect of the interfering flux from the motor flux signal.

8. The method of claim 3, further comprising compensating for the effects of an externally interfering flux by:

placing a compensating coil substantially in line with the pickup coil at an additional distance from the pickup coil to acquire an interfering flux signal, the additional distance selected such that the compensating coil links substantially none of the motor flux but does link the interfering flux; and prior to analyzing the motor flux spectrum, using the interfering flux signal to remove the effect of the interfering flux from the motor flux signal.

9. The method of claim 3, used for measuring the speed of an X-ray anode, wherein attaching the pickup coil to the outside of the housing comprises affixing the pickup coil to an outside of a housing of an x-ray tube comprising the X-ray anode.

10. An apparatus for determining an operational rotor frequency of an induction motor comprising a rotor and a stator, comprising:

a pickup coil for acquiring a motor flux signal from the motor; and a computer for:

analyzing a motor flux spectrum in a first vicinity of a specified frequency of the rotor to identify at least one identified rotor frequency candidate for the operational rotor frequency by identifying rotor current frequencies and harmonics in the first vicinity of the specified rotor frequency;

additionally analyzing the motor flux spectrum in a second vicinity of a specified frequency of the stator to derive at least one derived rotor frequency candidate for the operational rotor frequency by identifying and deriving fundamentals and sidebands of the stator in the second vicinity of the specified stator frequency; and comparing the at least one identified rotor frequency candidate with the at least one derived rotor frequency candidate to determine the operational rotor frequency.

11. The apparatus of claim 10, wherein the pickup coil is affixed to an outside of a housing enclosing the motor.

12. The apparatus of claim 11, wherein the motor is part of a larger apparatus in relatively constant rotary motion, and wherein the computer is adapted to compensate for the effects of an externally interfering flux by calculating an interfering flux spectrum of the interfering flux and modifying the motor flux spectrum by subtracting the interfering flux spectrum from the motor flux spectrum prior to analyzing the motor flux spectrum.

13. The apparatus of claim 11, wherein the motor is part of a larger apparatus in relatively constant rotary motion, and wherein the computer is adapted to compensate for the effects of an externally interfering flux by obtaining an interfering flux signal of the interfering flux and modifying the motor flux signal by subtracting the interfering flux signal from the motor flux signal prior to transforming the motor flux signal into the motor flux spectrum.

14. The apparatus of claim 11, further comprising a thin shield placed over the pickup coil such that the pickup coil resides substantially in between the housing and the shield, thereby shielding the pickup coil from an externally interfering flux.

15. The apparatus of claim 14, further comprising:

a compensating coil placed substantially on an opposite side of the shield from the pickup coil to obtain an interfering flux signal; wherein the computer is adapted to use the interfering flux signal to remove the effect of the interfering flux from the motor flux signal.

16. The apparatus of claim 11, further comprising:

a compensating coil placed substantially in line with the pickup coil at an additional distance from the pickup coil to acquire an interfering flux signal, the additional distance selected such that the compensating coil links substantially none of the flux from the motor but does link the interfering flux; and wherein the computer is adapted to use the interfering flux signal to remove the effect of the interfering flux from the motor flux signal.

17. An apparatus comprising:

an X-ray anode;

a motor including a rotor and a stator;

a housing enclosing the motor;

a pickup coil affixed to an outside of the housing for acquiring a motor flux signal from the motor; and a computer for:

analyzing a motor flux spectrum in a first vicinity of a specified frequency of the rotor to identify at least one identified rotor frequency candidate for an operational rotor frequency by identifying rotor current frequencies and harmonics in the first vicinity of the specified rotor frequency;

additionally analyzing the motor flux spectrum from the motor in a second vicinity of a specified frequency of the stator to derive at least one derived rotor frequency candidate for the operational rotor frequency by identifying and deriving fundamentals and sidebands of the stator in the second vicinity of the specified stator frequency;

comparing the at least one identified rotor frequency candidate with the at least one derived rotor frequency candidate to determine the operational rotor frequency; and using the operational rotor frequency to determine a motor speed.

* * * * *